United States Patent [19]

Dufour et al.

[11] Patent Number: 5,034,108
[45] Date of Patent: Jul. 23, 1991

[54] PLASMA PROCESS FOR INCREASING THE MOLECULAR WEIGHT OF HYDROCARBONS AND/OR DERIVATIVES THEREOF

[75] Inventors: Jacques J. Dufour; Yves P. R. Jean, both of Grand Couronne, France

[73] Assignee: Shell Oil Company, Houston, Tex.

[21] Appl. No.: 582,703

[22] Filed: Sep. 14, 1990

Related U.S. Application Data

[63] Continuation of Ser. No. 363,232, Jun. 8, 1989, abandoned.

[30] Foreign Application Priority Data

Jun. 15, 1988 [FR] France ................................ 88 08006

[51] Int. Cl.⁵ .............................................. C07C 2/00
[52] U.S. Cl. .................................... 204/168; 204/169; 208/107; 208/18; 585/953

[58] Field of Search ............... 204/165, 167, 168, 169; 585/953; 208/18, 107; 219/121.36, 121.59

[56] References Cited

U.S. PATENT DOCUMENTS

| | | | |
|---|---|---|---|
| 970,473 | 9/1910 | De Hemptinne | 204/167 |
| 3,248,446 | 10/1962 | Pollock et al. | 585/953 |
| 3,356,602 | 12/1967 | Coffman et al. | 204/165 |

Primary Examiner—John F. Niebling
Assistant Examiner—David G. Ryser

[57] ABSTRACT

A process is disclosed for increasing the molecular weight of hydrocarbons and/or derivatives thereof by contacting them with an active hydrogen-containing system which comprises generating a hydrogen-containing plasma at a pressure of at least 5 mm and allowing contact of said hydrocarbons and/or derivatives thereof in liquid form with the plasma-generated system and recovering therefrom a product having an increased average molecular weight.

15 Claims, 2 Drawing Sheets

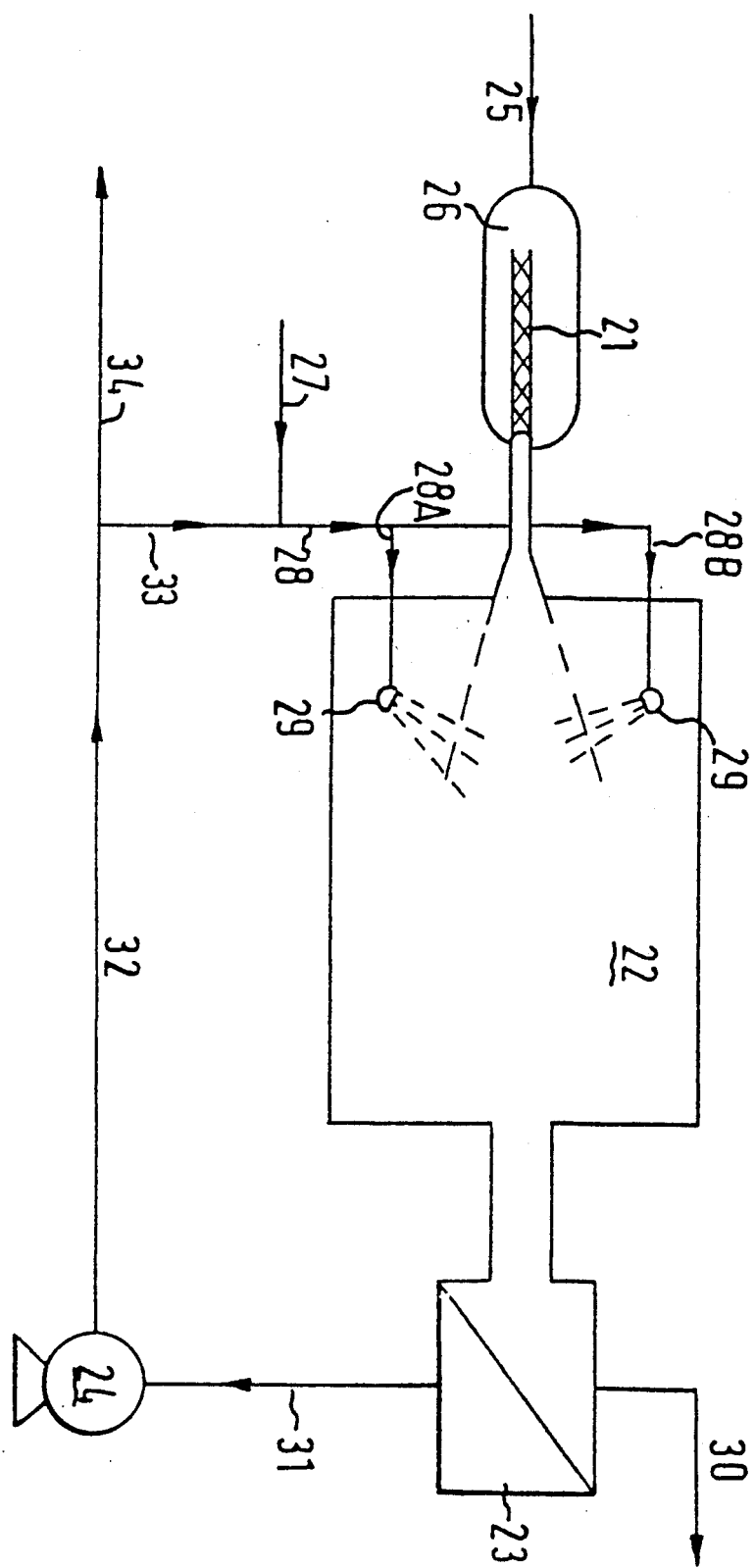

PLASMA PROCESS FOR INCREASING THE MOLECULAR WEIGHT OF HYDROCARBONS AND/OR DERIVATIVES THEREOF

This is a continuation of application Ser. No. 363,232, filed June 8, 1989, now abandoned.

FIELD OF INVENTION

The present invention relates to a process for increasing the molecular weight of hydrocarbons and/or derivatives thereof. The present invention relates in particular to a process for increasing the molecular weight of hydrocarbons containing one or more functional groups as described hereinafter.

Hydrocarbons are used in many applications which depend on the nature of the hydrocarbons concerned. In the present invention, emphasis is laid on hydrocarbons suitable in the field of lubricating but the invention is by no means limited to hydrocarbons and/or derivatives thereof which are known to be of interest in said field.

One of the important aspects of lubricating oils is their viscometric behavior. Well known and widely accepted parameters indicating the viscometric properties are the kinematic viscosity and the so-called viscosity index (VI) which is a measure for the internal resistance of a lubricating oil against changes in performance under both cold and hot conditions. Oils having a high VI are of great interest in that they can be used under extreme conditions without deteriorating performance.

BACKGROUND OF INVENTION

There are a number of methods known in the art to increase the VI of lubricating oils such as hydroisomerization of linear paraffins present in the lubricating oils or by the addition of so-called VI-improvers: polymers which are added to an oil in order to improve its viscosity/temperature relationship.

It is, of course, possible to increase the molecular weight of a given molecule by subjecting it to a dimerization or oligomerization treatment. In order to achieve this normally rather reactive molecules and/or stringent conditions have to be applied. Moreover, the di- or oligomerization envisaged should be kept under control since otherwise products with undesirable or even unfavorable properties would be obtained in ever increasing amounts.

The use of electric discharges to change the molecular weight of hydrocarbons is another method and, of course, in principle well known. The production of ethylene, acetylene and carbon black from hydrocarbonaceous materials by subjecting them to electrical discharges has been extensively recorded in the literature and several processes have become commercial. It will be clear that such processes when starting from normally liquid hydrocarbonaceous materials are in essence cleavage processes, i.e., not only carbon-carbon bonds are ruptured but also carbon-hydrogen bonds in order to obtain molecules of lower molecular weight.

It is less frequently reported in the literature to increase the molecular weight of normally liquid hydrocarbonaceous materials by using electrical discharges. When the influence of an electrical discharge is described in the literature for such materials it becomes clear that rather reactive molecules have to be processed by using a specific form of electrical discharge, commonly referred to as a corona discharge. In U.S. Pat. No. 3,356,602 a process is described relating to the dimerisation of carboxylic acids by submitting them to a high electrical field (causing the occurrence of the so-called corona-discharge) together with a group 8 inert gas and/or hydrogen. It is clear from said specification that good results are only obtained in systems operating under alternate current and containing ethylenic unsaturation. Subjecting a saturated compound such as stearic acid to the process described in said U.S. Pat. No. 3,356,602 leads only to a fractional increase in molecular weight compared with related unsaturated compounds such as oleic acid and linoleic acid (see Table III of U.S. Pat. No. 3,356,602).

It would, therefore, be highly advantageous when the molecular weight of hydrocarbonaceous materials could be increased substantially in a controlled and controllable manner. It would be particularly advantageous when the viscosity and possibly the VI of lubricating base oils could be increased by means of an electric discharge, especially when such lubricating base oils would contain functional groups such as carboxylic groups, ester groups, amino groups, and/or amido groups which would continue to be present in substantial amounts in the thus treated lubricating base oils having an increased viscosity and, optionally VI. It would also be very advantageous when such functional groups could be incorporated into the structure of lubricating base oils not containing such functional groups (or only minor amounts thereof) during the process which allows an increase in viscosity and/or VI.

BRIEF DESCRIPTION OF THE INVENTION

It has now surprisingly been found that an increase in the molecular weight of hydrocarbonaceous material, in particular of hydrocarbonaceous material containing one or more functional groups can be obtained in a controlled and controllable manner when use is made of an active-hydrogen containing system under certain conditions.

DETAILED DESCRIPTION OF THE INVENTION

Substantial increases in viscosity and optionally VI have been found both for hydrocarbonaceous-type lubricating base oils as well as for hydrocarbonaceous-type materials containing or receiving functional groups without impairing other important physical parameters of the materials thus treated. In some instances, even a lower pour point of the treated oils has been observed, which renders the process which allows an increased molecular weight and a higher viscosity and/or VI even more attractive.

The present invention, therefore, relates to a process for increasing the molecular weight of hydrocarbons and/or derivatives thereof by contacting them with an active-hydrogen containing system which comprises generating a hydrogen containing plasma at a pressure of at least 5 mm and allowing contact of said hydrocarbons and/or derivatives thereof in liquid form with the plasma-generated system and recovering therefrom a product having an increased average molecular weight.

It should be noted that the process according to the present invention allows at least an improvement of the viscosity and optionally also of the VI when a lubricating oil is used as feedstock. This means that the (high) viscosity is improved even further while maintaining or even increasing also the VI of oils based on already heavy molecules.

Without wishing to be bound to any particular theory, it would appear that by carrying out the process according to the present invention in such a way that the hydrocarbons and/or derivatives thereof are not directly submitted to the electrical field generating the hydrogen-containing plasma, it has become possible to control the conditions leading to desired increases in molecular weight while reducing or even preventing the amount of cracking which would occur if a hydrocarbon and/or a derivative thereof was placed directly in the influence of the electrical field of the electrical discharge applied.

The process according to the present invention can be carried out by using any hydrocarbon and/or derivative thereof which is liquid or solid under conditions of standard temperature and pressure.

Preference is given to the use of hydrocarbons ranging from the kerosene range to the heaviest grades of lubricating base oils. In particular, the process according to the present invention is carried out in order to increase the molecular weight (and therefore the viscosity and optionally the VI) of the so-called XHVI base oils, i.e., base oils having already a VI of at least 140. Various refinery feedstocks such as hydrocracker bottoms, XHVI gas oils as well as various kinds of cycle oils can be used in the process according to the invention. Also, mixtures of various hydrocarbons (e.g., various base oil compositions) can be used.

It has been found that the process according to the present invention can be carried out in a controllable manner: the molecular weight can be suitably increased by a factor of e.g. 30–150%, without suffering from disadvantages like cracking or coke formation.

If desired, and often preferred, the hydrocarbons to be treated in the process according to the present invention may contain functional groups which will remain substantially unchanged during the molecular weight increase. This is very important since such groups are either of value per se or can be used in further modifications envisaged.

Examples of functional groups which may be present in the hydrocarbons to be treated in accordance with the present invention comprise carboxylic groups, ester groups, amino, and/or amido groups. Typical examples of compounds carrying functional groups comprise carboxylic acids and carboxylic acid esters such as linoleic acid, oleic acid and the alkyl esters, in particular, the methyl and ethyl esters thereof. If desired, the hydrocarbon derivatives to be treated may contain two or more functional groups like the higher amino carboxylic acids and the corresponding esters. It will be appreciated that when mixtures containing both hydrocarbonaceous materials and hydrocarbon compounds containing one or more functional groups are treated in accordance to the present invention not only the molecular weight of the starting materials will be increased but that functional groups may also be incorporated into said hydrocarbonaceous materials.

It should be noted that also unsaturated compounds may be used together with the hydrocarbonaceous materials and/or derivatives to be treated in accordance with the present invention. Even under such circumstances the process can be carried out in a controllable mode.

In order to account for the possibility that a minor amount of the feedstock to be treated might undergo a (temporarily) molecular weight decrease which would offset the substantial molecular weight increase contemplated by the present invention, the expression "average molecular weight" will be used throughout the specification indicating an overall increase in molecular weight which should be in the order of at least 30% as described hereinbefore.

It is imperative in the process according to the present invention that the hydrocarbon(s) and/or derivatives thereof are contacted in liquid form with an active-hydrogen containing system which is obtained by generating a hydrogen-containing plasma at a pressure of at least 5 mm (Hg). A plasma is defined for the purpose of this invention as a gaseous medium containing electrical charges which as a whole are at electric neutrality. It will be clear that a hydrogen-containing plasma, therefore, does not only consist of hydrogen atoms and hydrogen molecules (e.g., obtained by pure thermal dissociation): $H_2O$ ions as well as electrons should also be present, provided the electric neutrality is preserved.

Molecular hydrogen is, of course, a suitable source to produce a hydrogen-containing plasma, but other hydrogen-containing species such as ammonia, hydrogen sulfide, methane, and/or $H_2O$ may be present, if desired, to contribute to the generation of the hydrogen-containing plasma. In general, the hydrogen-source should contain no less than 75% (on a molar basis) of molecular hydrogen. Conventional refinery hydrogen streams can be suitably applied.

The hydrogen-containing plasmas to be used in the process according to the present invention are suitably produced by so-called plasma torches, which are well-known as such and used in various branches of industry. Typically, plasma-torches having an energy-production in the range up to 8000 kW can be suitably applied. Preference is given to the use of plasma-torches having an energy-production in the range between 500 and 3000 kW.

In principle, any means for activating hydrogen to the extent that a hydrogen-containing plasma is formed can be used such as electrodeless discharges and appropriate laser beams.

The amount of activated-hydrogen needed in the process according to the present invention depends to some extent on the scale of the equipment used. In rather small reactors less than 1% of the hydrogen in an activated-system already gives remarkable increases in molecular weight. In larger reactors, directed at the production of rather large amounts of products having an increased average molecular weight, the amount of activated hydrogen could well be more than 40%, preferably more than 70%.

The hydrogen-containing plasma is produced at a hydrogen pressure which may range from as low as 5 mm up to several bar. Preference is given to the use of a hydrogen pressure in the range between 300 mm and 1 bar, in particular between 400 mm and 700 mm. It is preferred not to use a rather low hydrogen pressure since this would reduce the power density and hence the efficiency in generating the plasma while requiring a substantial increase in the volumes needed to carry out the process. Although in principle the use of hydrogen at a pressure above e.g. 10 bar is possible, it would require a very high temperature to reach a sufficiently high concentration of atomic hydrogen in the hydrogen-containing plasma under such conditions, which would have serious economic disadvantages.

If desired, inert gases like argon or helium can be present in the hydrogen-containing system which will be used to generate the plasma but they do not contribute substantially to the process, contrary to what is normally observed in corona-type discharges.

The process according to the present invention can be suitably carried out in a discharge-equipment provided with recycle-means in order to increase the overall yield of the process.

BRIEF DESCRIPTION OF THE DRAWINGS

FIG. 2 represents an alternative flow scheme of this process.

DETAILED DESCRIPTION OF THE DRAWINGS

Figure 1:
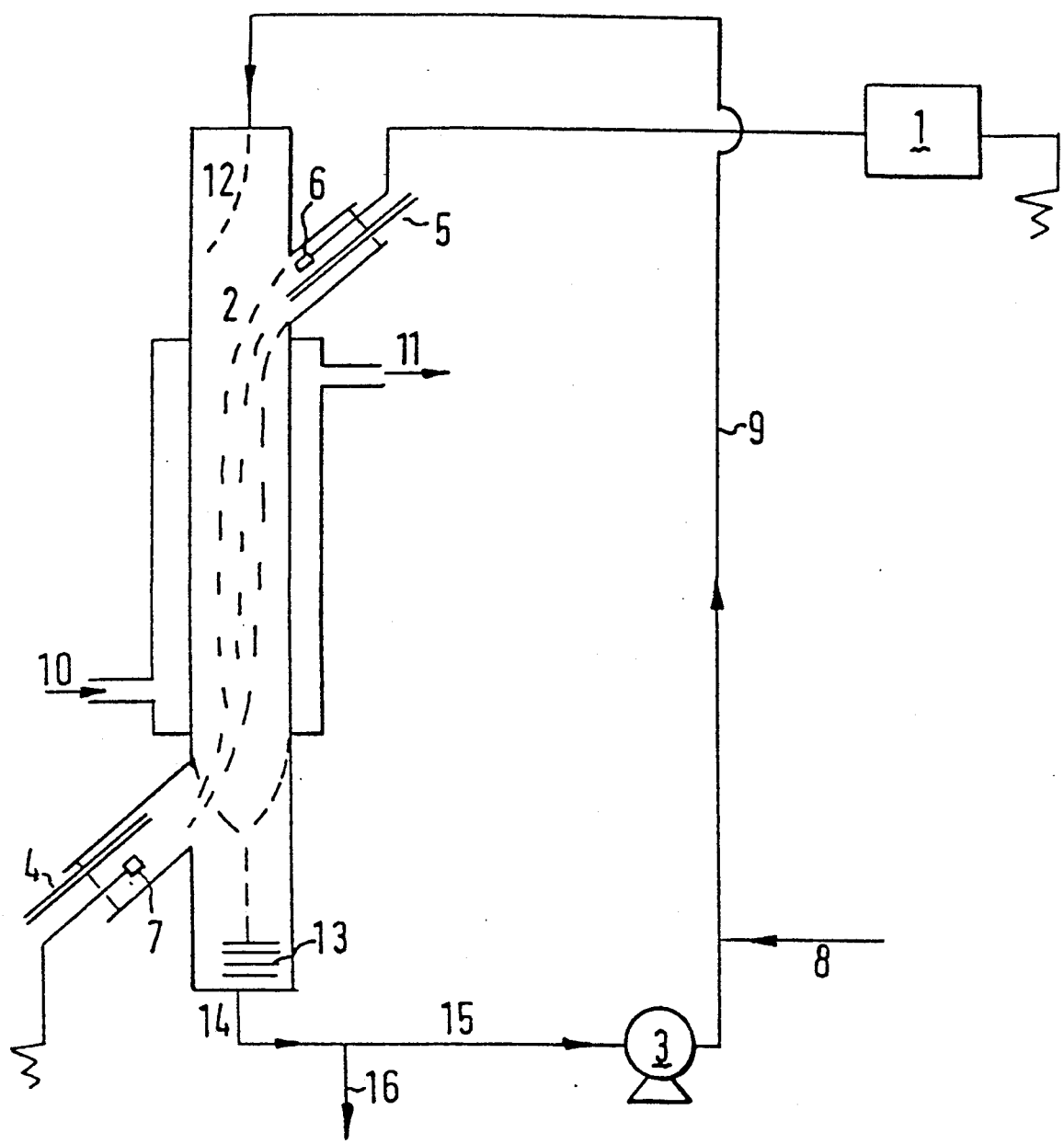
FIG. 1 represents a flow scheme of this process.

An embodiment of the process according to the present invention is depicted in FIG. 1. The apparatus comprises a high voltage generator 1, a reactor 2 and a recycle pump 3. Hydrogen is introduced into the reactor via inlet 4 and withdrawn from the system via outlet 5 (normally by means of a vacuum pump, not shown). The current necessary to produce the active-hydrogen containing plasma is introduced via electrode 6 and leaves the system via electrode 7. The electrodes are normally composed of stainless steel. The hydrocarbon and/or derivative to be treated is introduced via line 8 and sent via line 9 to the top of reactor 2, in this particular case a glass tube provided with external temperature controlling means indicated with 10 and 11. When the power is switched on, the discharge can be observed in the apparatus in the form of a bright violet/purple display when the hydrogen is sucked through the reactor.

The hydrocarbon to be treated (12) flows as a thin film along the walls of the reactor 2 and is collected at the bottom part of the reactor 2, indicated by 13. It is removed from the reactor via line 14 and recycled to pump 3 via line 15 with the possibility to withdraw product via line 16.

A further embodiment of the process according to the present invention is depicted in FIG. 2. The apparatus comprises a plasma torch 21, an expanding area 22, an oil/gas separating means 23 and a recycle pump 24. Hydrogen is introduced via line 25 into plasma generating device 26.

The plasma generating equipment is operated in such a way that hydrogen is introduced at about 1 bar and has a temperature of about 4500° K. when leaving the torch. It is important in the apparatus operating under these conditions of temperature and pressure to allow for expansion of the hydrogen-plasma created.

It has been found that the plasma should be allowed to expand to such an extent that the pressure of the generated plasma in the expansion area 22 ($P_2$) is at most 0.6 times the initial pressure at which the plasma was generated ($P_1$). Preferably, the expansion area 22 is constructed in such a way that a $P_2$ of no more than 0.2, and preferably less than 0.1 of the initial pressure $P_1$ is achieved. Good results can be obtained when the pressure at the end of the torch is relieved from atmospheric to between 20 and 50 mm since such pressure drops allow an optimal contact between the species generated in the plasma (but not necessarily having the initial composition of the plasma) and the hydrocarbons and/or derivatives to be treated.

Normally, the feedstock to be treated is introduced via line 27 and sent via lines 28, $28^A$ and $28^B$ to openings 29 in the expansion area 22 to allow introduction of the feedstock to be treated in liquid form downstream of the generated activated hydrogen-plasma. Contact between the oil to be treated and the plasma-generated system takes place inside area 22. The resulting mixture obtained is sent to oil/gas separation chamber 23 allowing for the gaseous part (consisting mainly of unchanged and recombined hydrogen) to be sent to compression in order to be introduced again into the system via line 30 which is linked (not shown) with line 25. The oil phase is sent via line 31 to recycle pump 24 to bring it at the desired pressure level to be recycled via lines 32 and 33 to line 28 for reintroduction with the expanding area. Product can be withdrawn from recycle stream 32 via line 34. It should be noted that the proper dimensions of the expansion area allow for a reduction in temperature to about 2500° K. and to a pressure of about 30 mm.

By properly choosing the recycle ration of the hydrocarbonaceous material processed and by adjusting the size of the droplets to be introduced via openings 29 into expansion area 22, the reaction can be controlled in such a way that the appropriate average molecular weight increase is achieved. The present invention will now be illustrated by means of the following examples.

EXAMPLES

Example 1

An XHVI base oil having the properties as expressed in Table I was processed in the equipment as described in FIG. 1. The reactor was operated under the following conditions:

| | |
|---|---|
| total pressure | 35 mm (Hg) |
| current | 1–3 mA |
| voltage | 10,000–15,000 V |
| distance between stainless steel electrodes | 40 cm |
| inlet water temperature (10) | 40° C. |
| base oil temperature (13) | 60° C. |
| energy input | 14 Wh/g |

The results of this experiment are also given in Table I. No cracking was observed and the average molecular weight increase was no less than 46%. The viscosity in cSt (at 100° C.) was raised from 8 to 19.6 while also an increase in VI and a decrease in pour point was observed.

TABLE I

| | XHVI UNTREATED | HXVI TREATED |
|---|---|---|
| viscosity (100° C.) | 8 cSt | 19.6 cSt |
| viscosity (40° C.) | 46.8 cSt | 153.4 cSt |
| VI | 143 | 147 |
| Pour Point (°C.) | −16 | −18 |
| Volatility (Noack) (%) | 4.1 | 3.1 |
| Flash Point (°C.) | 237 | 237 |
| Average molecular weight | 578 | 846 |

EXAMPLE 2

Methyl oleate having an average molecular weight of 292 was processed in the equipment as described in FIG. 1. The reactor was operated under the conditions as described in the previous Example but this time with an energy input of 10 Wh/g. No cracking was observed and the average molecular weight measured (by tonometry) was 493, giving an increase in molecular weight of 66%. From I.R.-spectroscopy it was found that the ester function was maintained quantitatively in the product as treated.

EXAMPLE 3

Squalane (molecular weight 422) was processed as described in Example 1, but using an energy input of 12 Wh/g. No cracking was observed and the average molecular weight of the product was 521 giving an increase in molecular weight of 23%. From the distillation curve it was clear that dimers had been produced. By increasing the energy-input or by extending the run length, a higher amount of dimers as well as the formation of trimers and tetramers can be observed.

EXAMPLE 4

The process as described in Example 3 was repeated but in the presence of 10%w of methyl oleate as described in Example 2. Under otherwise identical conditions the product obtained had a substantially increased average molecular weight and it was demonstrated by means of the distillation curve that co-oligomers of squalane and methyl oleate had been formed (comparison with the distillation curves observed for the experiments described in Examples 2 and 3).

EXAMPLE 5

The process as described in Example 3 was repeated but in the presence of 10%w of 2 2'-diethyldihexylamine. Under otherwise identical conditions the product obtained showed an average molecular weight of 894, ranging from 622 to 1083. The presence of co-oligomers of the amine and squalane was demonstrated by comparison of the appropriate distillation curves.

What we claim as our invention is:

1. A process to increase the molecular weight of a hydrocarbon or a hydrocarbon derivative which comprises generating a hydrogen-containing plasma at a pressure of at least 5 millimeters (Hg) using an electrical field, contacting said hydrocarbon or hydrocarbon derivative in liquid form with the hydrogen-containing plasma in such a way that the hydrocarbon or hydrocarbon derivative is not directly submitted to the electrical field generating the hydrogen-containing plasma to produce a product having a higher average molecular weight than said hydrocarbon or hydrocarbon derivative, and recovering said product.

2. The process of claim 1, wherein said hydrocarbon has a boiling point ranging from that of kerosene to that of heavy grade lubricating oil.

3. The process of claim 1, wherein the hydrocarbon is a lubricating oil having a viscosity index of at least 140.

4. The process of claim 1, wherein said hydrocarbon derivative contains one or more functional groups which remain unchanged throughout the contact with the hydrogen-containing plasma.

5. The process of claim 4, wherein said functional groups comprise carboxylic acid groups, ester groups, amino groups, amido groups, and combinations thereof.

6. The process of claim 4, wherein said hydrocarbon derivative is linoleic acid or oleic acid or methyl oleate.

7. The process of claim 4, wherein said hydrogen-containing plasma comprises molecular hydrogen.

8. The process of claim 7, wherein said hydrogen-containing plasma contains, on a molar basis, up to 25% ammonia, hydrogen sulfide, methane, water or a combination thereof.

9. The process of claim 1, wherein said hydrogen-containing plasma is generated by a plasma torch.

10. The process of claim 9, wherein said plasma torch has energy production in the range of 500–3000 kW.

11. The process of claim 1, wherein said hydrogen-containing plasma is generated at a hydrogen pressure is the range of 300 millimeter (Hg) to 1 bar.

12. The process of claim 11, wherein said hydrogen pressure is from 400 to 700 millimeter (Hg).

13. The process of claim 1, which further comprises expanding the plasma generated to a value of, at most, 0.6 times the initial pressure at which said plasma was generated.

14. The process of claim 13, comprising expanding the plasma generated to a value of, at most, 0.2 times the initial pressure at which said plasma was generated.

15. The process of claim 14, comprising expanding the plasma generated to a value of less than 0.1 times the initial pressure at which said plasma was generated.

* * * * *